United States Patent
Westall et al.

(10) Patent No.: US 6,718,161 B1
(45) Date of Patent: Apr. 6, 2004

(54) APPARATUS AND METHOD FOR REDUCING LATENCY AND BUFFERING ASSOCIATED WITH MULTIPLE ACCESS COMMUNICATIONS SYSTEMS

(75) Inventors: Kenneth E. Westall, Seal Beach, CA (US); Konstantinos Makrygiannis, Torrance, CA (US); Mark K. Christopher, Redondo Beach, CA (US); Mark Kintis, Manhattan Beach, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 532 days.

(21) Appl. No.: 09/587,316

(22) Filed: Jun. 5, 2000

(51) Int. Cl.[7] .................. H04Q 7/20; H04B 7/185
(52) U.S. Cl. ............ 455/12.1; 455/427; 455/456.1; 455/562.1
(58) Field of Search .................. 455/427, 428, 455/429, 456.1, 457, 12.1, 13.1, 13.3, 561, 562.1, 63.1, 63.2; 342/352, 354, 357.01, 357.06, 357.1, 368

(56) References Cited

U.S. PATENT DOCUMENTS

| | | | |
|---|---|---|---|
| 4,852,090 A | | 7/1989 | Borth |
| 5,151,926 A | | 9/1992 | Chennakeshu et al. |
| 5,155,742 A | | 10/1992 | Ariyavisitakul et al. |
| 5,222,101 A | | 6/1993 | Ariyavisitakul et al. |
| 5,281,811 A | | 1/1994 | Lewis |
| 5,295,152 A | | 3/1994 | Gudmundson et al. |
| 5,440,545 A | | 8/1995 | Buchholz et al. |
| 5,596,333 A | * | 1/1997 | Bruckert ............... 342/457 |
| 5,636,208 A | | 6/1997 | Chang et al. |
| 5,930,254 A | * | 7/1999 | Liron et al. ........... 370/238.1 |
| 5,977,907 A | * | 11/1999 | Gross .................. 342/354 |
| 6,377,558 B1 | * | 4/2002 | Dent .................... 370/321 |

* cited by examiner

Primary Examiner—Erika Gary

(57) ABSTRACT

A multiple access communications system includes a communications unit, such as satellite or a mobile link base station, and an antenna disposed thereon. The antenna has the capability to direct an antenna beam at a selected user on a packet by packet basis thereby reducing the latency, buffering, and non-uniform gain distribution associated with conventional transmission systems.

42 Claims, 5 Drawing Sheets

APPARATUS AND METHOD FOR REDUCING LATENCY AND BUFFERING ASSOCIATED WITH MULTIPLE ACCESS COMMUNICATIONS SYSTEMS

BACKGROUND OF THE INVENTION

1. Field of the Invention

The present invention relates generally to satellite-based communications systems and, more specifically to such a system that includes an apparatus and method for reducing latency and buffering associated with multiple access communication.

2. Description of the Prior Art

Conventional satellite-based communication systems maintain an orbit above the earth and contain at least one antenna that provides coverage to an area on the earth's surface by producing a series of beams that divide the antenna's coverage area into a pattern of contiguous circular regions or cells. Operationally, an antenna beam is pointed to each cell in a fixed sequential pattern to nominally cover a cellular region where there are multiple users (receivers) distributed within the cell. Several disadvantages are inherent in the conventional system described, the most significant being, latency, buffering, and non-uniform gain distribution.

In conventional systems where time division multiple access (TDMA) downlinks are used with a time framing structure, excess buffering and undesired latency may result. The latency and buffering are necessary because these systems must store continuous or packetized communications in a flexible buffer awaiting the arrival of a correct time slot when the data will be burst communicated to a receiver. Specifically, the satellite beam cycles through the cells on the ground in a fixed sequence and each user's data is stored in the frame buffer until the satellite beam points to their cell position. For example, in a satellite system servicing cells numbered one through six, the satellite sequentially passes a beam through each of the six cells until all the cells have been serviced after which the service pattern is repeated. Latency and buffering may be particularly evidenced where, for illustration, cell five has just been serviced, the beam moves to service cell six and a packet arrives for a user in cell five. The cell five data must be buffered until the satellite completes the service of cell six and cells one through four.

Likewise, the desire to flexibly support a maximum number of users within a frame period (i.e. a high number of multiple access slots) and a long period for each slot must be balanced against a short frame length. Specifically, because a frame length time period defines the worst case latency, the frame length must be kept short so as to minimize this latency. In systems where no balance is made between frame length and latency, the communications overhead associated with slot transition boundaries and the hardware complexity associated with the slot transition rate is not minimized.

Additionally, the fixed characteristics of a frame based TDMA structure may create constraints on any supported distributions of multiple access capacity. For example, a fixed TDMA framing structure may require excessive re-slotting of individual receivers where there is a high level of unpredictability in the number or receivers serviced. Excessive re-slotting of individual users may also be required where there is data rate variation across a set of receivers, a temporal variation in the data rate per receiver, or unpredictability in the geographical distribution of communications density.

Finally, in conventional systems, there may be a substantial amount of gain variation or signal variation over a cell. As a result, certain users within a cell are disadvantaged; particularly those users at the very edge of the cell where gain is low or the antenna beam may not have optimal pointing.

Based on techniques known in the art for multiple access communications systems, a communications system that reduces the effects of latency and buffering and optimizes the signal gain for ground users is highly desirable.

SUMMARY OF THE INVENTION

It is an aspect of the present invention to provide a communications system that includes a unit that includes an antenna disposed on the unit where the antenna has a transmitter and a means for radiating radio frequency (RF) energy along a beam in a plurality of beam coverage areas over a predetermined region of the earth. Each beam has a peak wherein the power of the beam is strongest at the peak and the peak illuminates an area defined by a radius having a predetermined length. The communications system includes a selected user having a terminal station for receiving an RF signal containing packet datum, wherein the terminal station communicates selected user location datum to said unit and receives packet datum from said unit. The communications system further receives, within the unit, an RF signal containing packet datum and transmits the packet datum to a selected user, whereby the antenna beam peak is pointed directly at the selected user. Alternatively, the communications system may comprise a plurality of transmitters where the transmitters simultaneously transmit and are coordinated to decrease co-channel interference.

It is also an aspect of the present invention to provide a method for producing a communications system. The method comprises the steps of providing a unit located at a predetermined location and including an antenna disposed on the satellite, the antenna having a transmitter and radiating radio frequency (RF) energy along a beam in plurality of beam coverage regions over a predetermined region of the earth. Providing a beam having a peak wherein the power of the beam is strongest at the peak, the peak has a radius of predetermined length emanating from a focus of the beam coverage area. Providing a selected user having a terminal station, wherein the terminal station communicates location datum to the unit and receives packet datum from the unit. Receiving at the unit, a RF signal containing packet datum and transmitting, from the unit, a RF signal containing packet datum to the selected user, whereby the antenna beam peak is pointed directly at the selected user.

BRIEF DESCRIPTION OF THE DRAWINGS

Reference is now made to the following description and attached drawings, wherein:

FIG. 1b illustrates a blown up view of the satellite based multiple access communications system shown in FIG. 1a;

DETAILED DESCRIPTION OF THE INVENTION

Briefly, the present invention relates to a multiple access communications system and a method for producing the same where transmission downlink latency, buffering and non-uniform gain distribution are mitigated by a "point and shoot" communications data transmission.

The present invention discloses a multiple access communications system where a "point and shoot" transmission method is used in a single or multiple simultaneous transmitter system. The "point and shoot" transmission method is described generally where a single user within a satellite coverage area receives the downlink signal of a particular antenna beam for a particular data quanta interval by pointing the antenna beam directly at the user. The beam hops from user to user servicing all of the satellite coverage area. Those of ordinary skill in the art should understand that the principles of the present invention are applicable to many types of communications systems. However, as previously mentioned, the present invention relates specifically to a satellite-based system and, more particularly, to a multiple access satellite-based system.

Figure 1A:
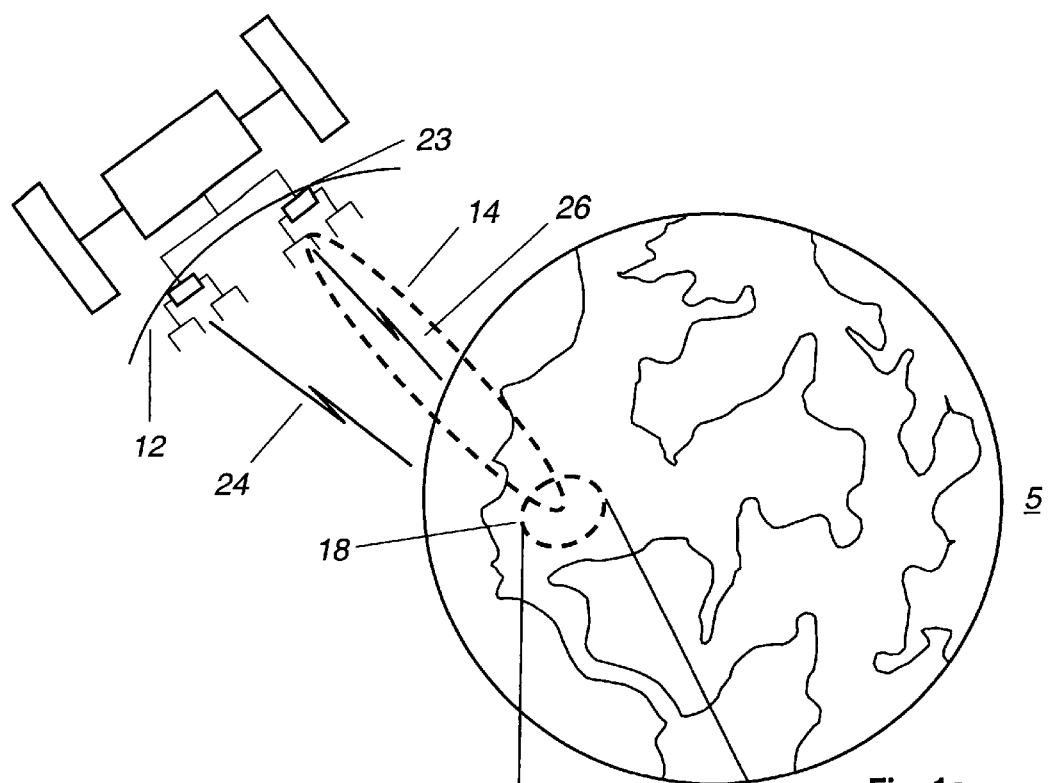
FIG. 1a illustrates a satellite based multiple access communications system according to the present invention.
Figure 1B:
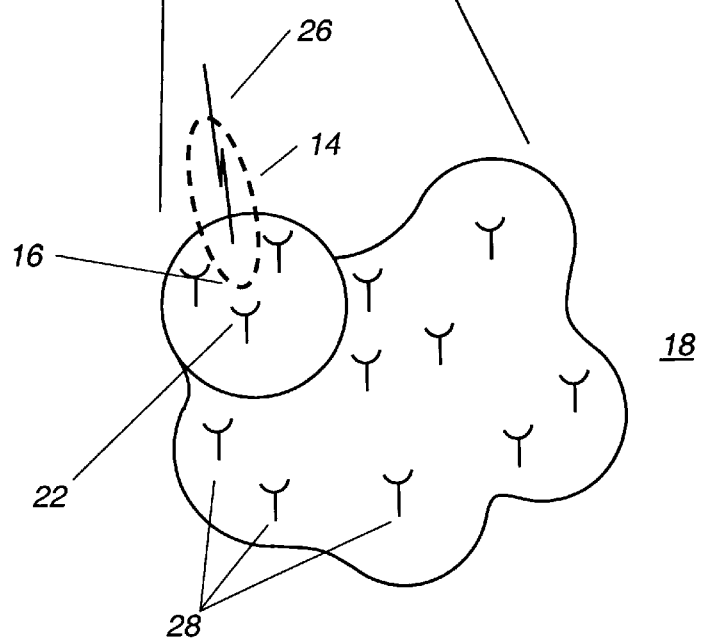

As generally illustrated in FIG. 1a, the multiple access satellite-based system 5 of present invention includes a satellite 10 located in space over the earth and an antenna 12 disposed on the satellite 10. The antenna 12 radiates radio frequency (RF) energy along a beam 14 in a plurality of locations over a predetermined coverage region 18 of the earth. Referring to FIG. 1b, the satellite 10 receives communications datum (packet datum) on an uplink 24 and transmits packet datum on a downlink 26 to selected users 28 by pointing a peak 16 of the beam 14 directly at a selected user 22. For the purposes of the preferred embodiment, the antenna 12 is a phased-array antenna. However, the antenna 12 may alternatively be a multi-beam or similar antenna having the capability to radiate multiple beams. It is also important to note that the satellite system 5 may be a geostationary earth orbiting (GEO), a medium earth orbiting (MEO), or a low earth orbiting (LEO) system.

Figure 2:
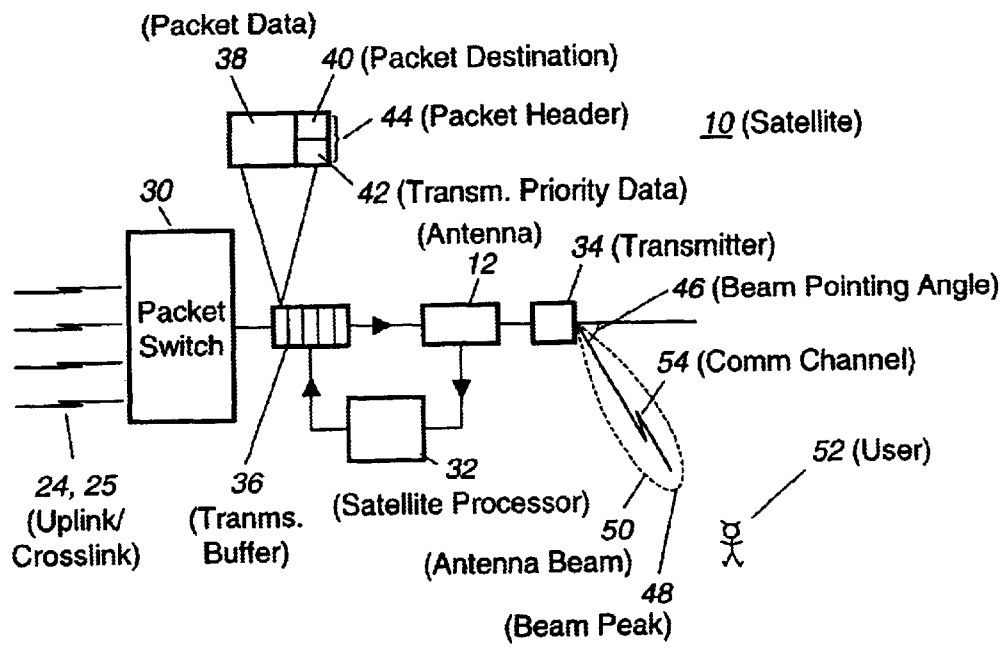
FIG. 2 illustrates, in block diagram form, a packet switch, processor and antenna carrying out the primary functions of a single transmitter communications system in accordance with the present invention.

Specifically, and as illustrated in FIG. 2, the satellite 10 contains a packet switch 30, that is receiving data from potentially multiple resources that communicate to the satellite 10 via the uplink 24 or via a crosslink 25 from another satellite (not shown). The packet switch 30 reads a packet header 44 and routes the packet data 38 to the downlink antenna 12 disposed on the satellite 10. The packet header 44 may contain information such as user destination (packet destination) 40 and transmission priority data 42 that are later used by the downlink antenna 12 to transmit the packet datum 38 to a selected user 52.

The downlink antenna 12 utilizes a processor 32 and transmitter 34. The processor 32 receives user destination data 40, transmission priority data 42 and packet data 38 from the packet switch 30. The processor 32 stores the packet data 38 to a fixed length transmission buffer 36. The packet data 38 stored to the transmission buffer 36 awaits transmission and is typically stored on a first-received first-transmitted basis but may be stored by transmission priority. In cases where packet data 38 is stored by transmission priority, the processor 32 arbitrates and monitors the transmission of the data packet 38 based on packet destination and transmission priority so that data packets 38 having the highest priority are moved to the front of the transmission buffer 36 for earlier transmission.

Figure 4A:
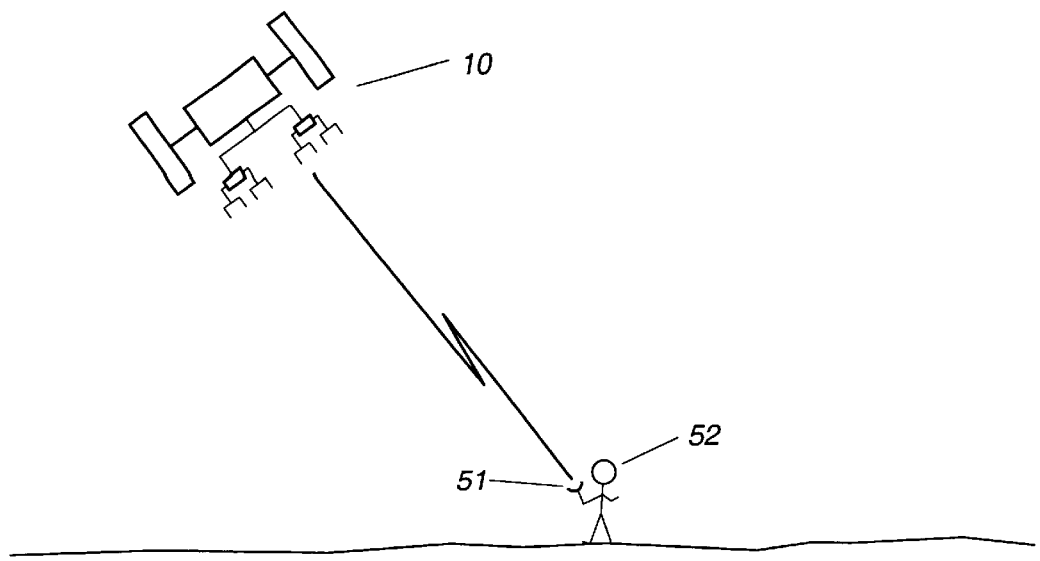
FIG. 4a illustrates a user communicating fixed ground location data to a communications satellite in accordance with the present invention.

In addition to maintaining the transmission buffer 36, the processor 32 commands the antenna 12. The antenna 12 has a rapid, short duration pointing requirement and has to re-point itself frequently on a packet by packet basis. To support the rapid pointing requirement the processor 32 must be able to command the antenna 12 in near real time. Specifically, the satellite 10 must be able to transmit a data packet 38 destined for a selected ground user 52 in near real time and the selected ground user 52 must be able to communicate his location to the satellite 10. As illustrated in FIG. 4a, a fixed user 52 may preferably determine his location once and communicate this information to the satellite 10 via his terminal station 51 at service logon. The location is then stored and maintained in a table or similar structure onboard the satellite 10 until the user 52 is no longer within the coverage area of the satellite 10. If the user 52 is mobile, his position must be communicated periodically to the satellite 10.

Figure 4B:
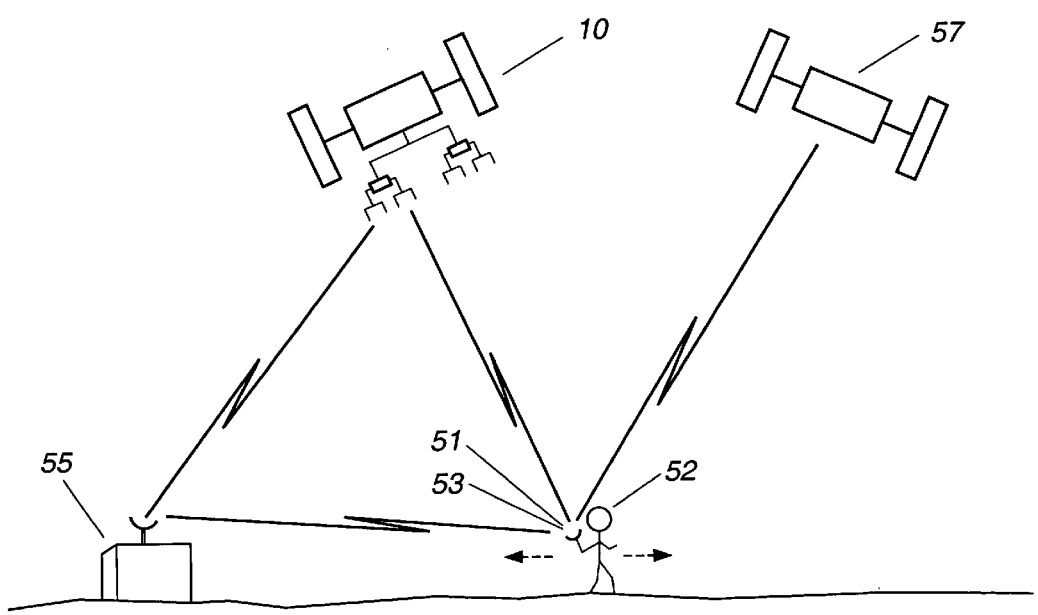
FIG. 4b illustrates a user and network control center communicating mobile ground location data to a communications satellite in accordance with the present invention.

Preferably, as illustrated in FIG. 4b, a global positioning satellite (GPS) receiver 53 is placed in the mobile ground user's 52 terminal station 51. When first logging on to the satellite's 10 service, the terminal station 51 communicates ground location data received from the global positioning satellite 57, to the satellite 10. The satellite 10 authenticates the user 52 with a ground network control center (NCC) 55. The NCC 55 may maintain a large table of ground user location data that is updated as the satellite 10 moves over the earth or the user 52 moves along the earth. The NCC 55 periodically communicates ground user location data to the satellite 10 for only those users within the satellite's field of view and the satellite 10 stores this information to an onboard table.

Referring to FIG. 2, the satellite processor 32 either via hardware or software uses a table lookup or similar procedure to map a packet user destination 40 to a corresponding angle of elevation and azimuth that form a beam pointing angle 46. This beam pointing angle 46, broken into its composite two dimensions, is the azimuth and elevation where the antenna 12 must be mechanically or electrically steered to point at a desired point on the earth. The angle of elevation (elevation pointing angle) and azimuth of a the satellite antenna 12 are computed from the ground user location data using well understood, commonly used pointing algorithms. Generally, a satellite maintains a fixed orientation with respect to the earth. This process of maintaining the fixed orientation is termed "station keeping" and may be accomplished by monitoring or tracking the positions of various stars, the sun and the limb of the earth. By tracking these positions, the satellite 10 may maintain a fixed orientation of its body to the earth. Since the satellite antenna 12 is a mechanical structure fixed to the satellite body, the satellite 10 may compute the beam pointing angle 46 between the antenna mechanical structure 12 and any point on earth.

Figure 5:
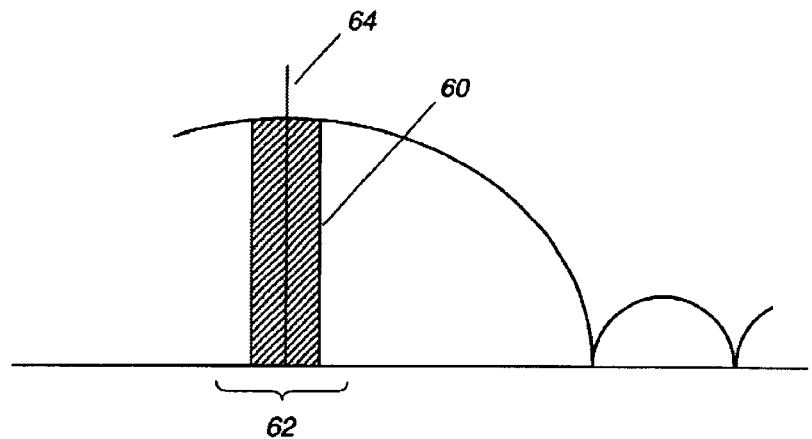
FIG. 5 illustrates a beam peak area in accordance with the present invention.

At approximately the time the packet data 38 arrives at the antenna transmitter 34, the beam pointing angle 46 is commanded to the transmitter 34 and an antenna beam 50 is formed having a pointing angle 46 which directs the peak 48 of the antenna beam 50 at a selected user 52. The peak direction 48 of the antenna beam 50 is "directed at" the selected user 52 when the terminal station 51 of the selected user 52 receives the power of the antenna beam 50 that is within approximately two-fifths to one-third of 1 dB less than the maximum gain of the antenna 12. For example, as shown in FIG. 5, the peak direction of a 3 dB beamwidth antenna may be defined by a region 60 that is approximately 40% of the beamwidth 62 measured about the focal axis 64 of the beam. In conventional systems, a beam dwells within the predefined area of a cell and users who are located at the fringes of the cell do not receive the full power of the beam. Conversely, by pointing the peak of a beam directly at a user within a cell, a gain performance of from 3.5 dB to 4.5 dB may be achieved and the satellite power resource requirements may be reduced by more than a factor of two.

Referring to FIG. 2, the satellite 10 transmits packets of communications data (herein referenced as packet datum) 38 over an assigned communications channel 54. The carrier frequency corresponding to that of the antenna beam 50 is used to communicate packet datum 38 to a selected user 52. In order to increase the overall capacity of the communications channel 54, the present invention preferably illustrates the use of a time-based multiple access protocol. Specifically, the beam 50 points at the selected user 52 for a time period (N time slots) where the user's packet datum 38 is burst communicated and, after the N time slots, another beam is formed by the process described above where a newly formed beam is pointed at the next user. It is important to note that other multiple access techniques may be used to increase the overall channel capacity of the communications system. For example, a multiple access protocol that is both time and frequency based may be used.

Figure 3:
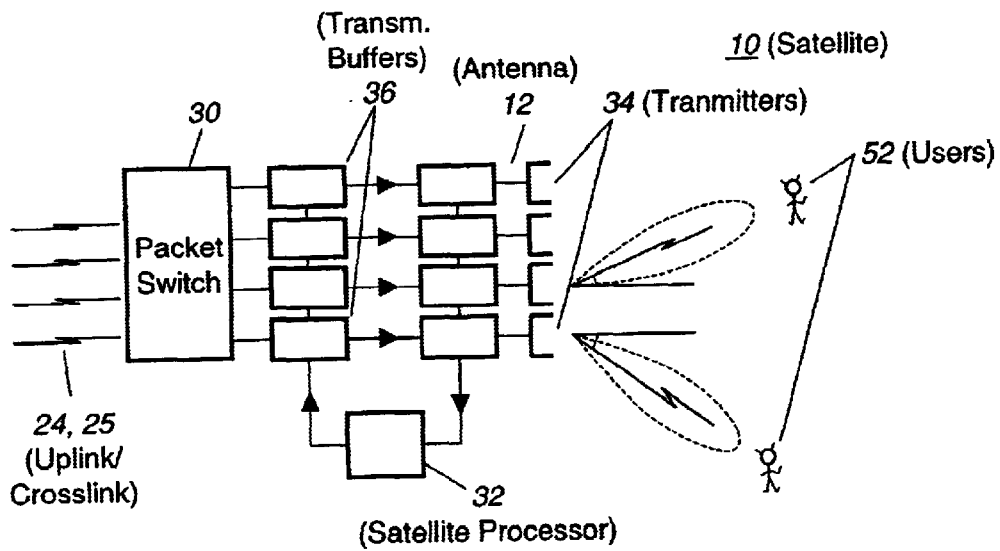
FIG. 3 illustrates, in block diagram form, a packet switch, processor and antenna carrying out the primary functions of a multiple simultaneous transmitter communications system in accordance with the present invention.

Alternatively, and as illustrated in FIG. 3, the antenna 12 may include multiple simultaneous transmitters 34. Contrasted to the single transmitter system illustrated in FIG. 2, the processor 32 must arbitrate and control the beams formed by the multiple transmitters 34 to eliminate co-channel interference. In other words, multiple transmitters may not "point and shoot" at the same beam coverage area, for the same time and frequency band. The processor 32 arbitrates and controls multiple simultaneous transmitters 34 by selectively queuing (based on angle of separation) data packets in each transmitter prior to transmission. Specifically, the angle of separation between two transmitters is calculated using the formula:

$$|A_s| = a_x - a_y$$

where:

$|A_s|$=angle of separation (absolute value);

$a_x$=transmitter, beam pointing angle; and $a_y$=transmitters beam pointing angle.

The angle of separation $A_s$ is compared to a predetermined minimum angle of separation and if the angle of separation $A_s$ is less than the predetermined minimum angle of separation a condition for co-channel interference is satisfied. In this case, the processor 32 may reorder packets 38 in one or more queues 36 until a minimum angle of separation is achieved.

Figure 6A:
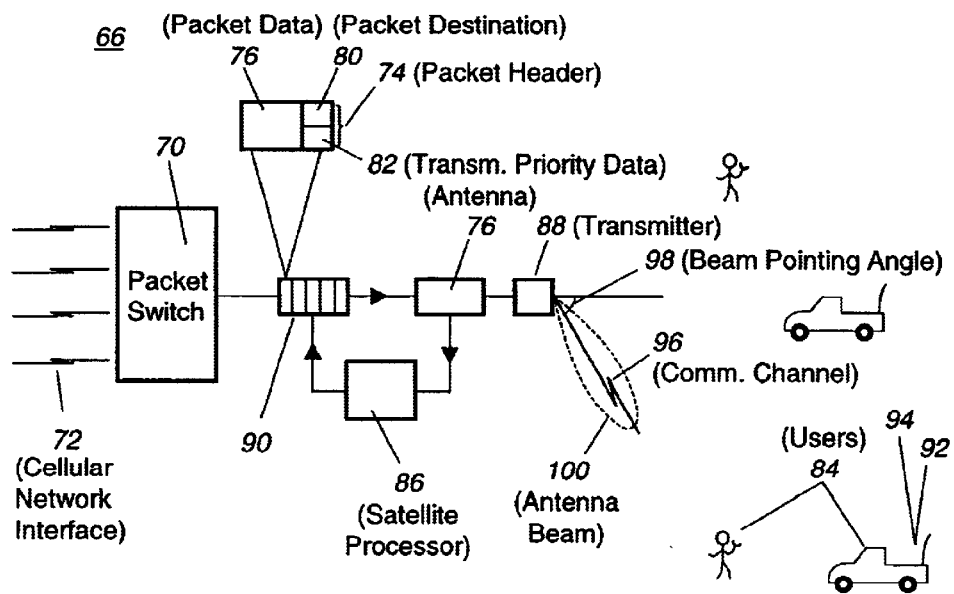
FIG. 6a illustrates in block diagram form, a packet switch, processor, and antenna carrying out the primary functions of a single transmitter communications system in accordance with an alternate embodiment of the present invention.
Figure 6B:
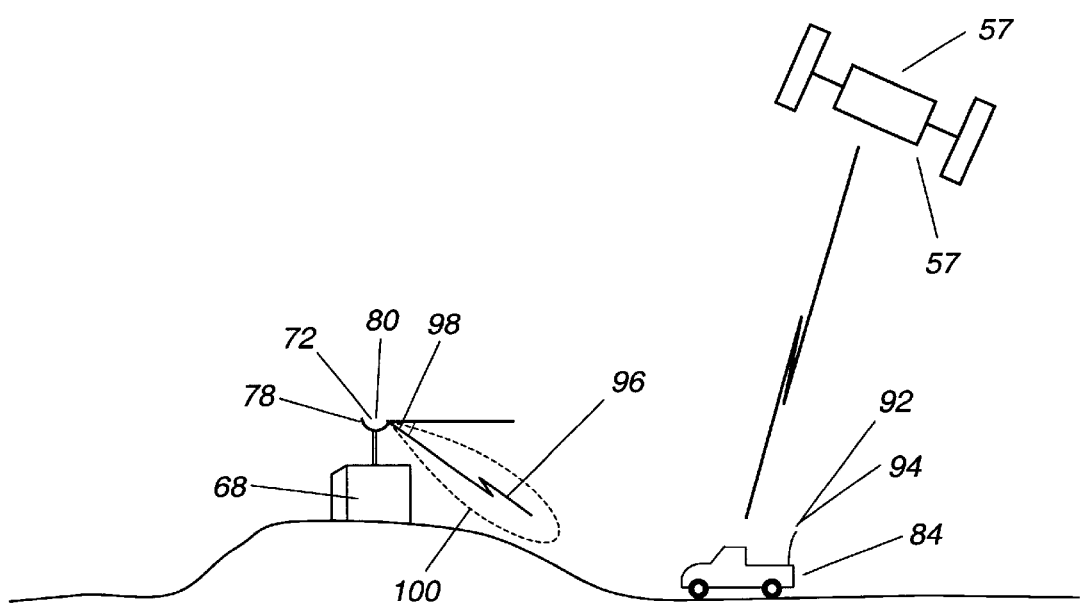
FIG. 6b illustrates a user communicating mobile ground location data to a mobile base station in accordance with the present invention.

Referring to FIGS. 6a and 6b, in accordance with an alternate embodiment of the present invention, a terrestrial-based communications system 66 having a mobile base station 68 of similar operation as the satellite system 10 in FIG. 2 is shown. The communications system 66 is a mobile subscriber forward link system that includes a mobile link base station 68 preferably located on a hilltop, a building top, or a similarly elevated site, as shown in FIG. 6b. The mobile link base station 68 contains a packet switch 70 that is receiving data from potentially multiple resources that communicate to the mobile link base station 68 via a cellular network interface 72. The packet switch 70 reads a packet header 74 and routes the packet data 76 to a transmit antenna 78 located at the base station 68. The packet header 74 may contain information such as user destination 80 and transmission priority data 82 that are later used by the transmit antenna 78 to transmit the packet datum 76 to a selected user 84.

The transmit antenna 78 utilizes a processor 86 and a transmitter 88 similar to that shown in FIG. 2. The processor 86 receives user destination data 80, transmission priority data 82 and packet data 76 from the packet switch 70. The processor 86 stores the packet data 76 to a fixed length transmission buffer 90. The packet data 76 stored to the transmission buffer 90 awaits transmission and is typically stored on a first-received first-transmitted basis but may be stored by transmission priority. In cases where packet data 76 is stored by transmission priority, the processor 86 arbitrates and monitors the transmission of the data packet based on packet destination and transmission priority so that data packets 76 having the highest priority are moved to the front of the transmission buffer 90 for earlier transmission.

In addition to maintaining the transmission buffer 90, the processor 86 commands the antenna 78 to re-point itself on a packet by packet basis to a selected user 84. Since the user 84 is mobile, her position is periodically communicated to the mobile link base station 68. A global positioning satellite receiver 92 is placed in a mobile ground user's 84 terminal station 94. The terminal station 94 communicates ground location data received from a GPS satellite 57 to the mobile link base station 68 at login to the base station cellular network interface 72 and periodically during the period the user 84 is being serviced. The base station 68 stores this ground location information to an internal table.

Using methods described in the previous embodiment, at approximately the time the packet data 76 arrives at the antenna transmitter 88, a beam pointing angle 98 is determined. The beam pointing angle 98 is commanded to the transmitter 88 and an antenna beam 100 is formed corresponding to the pointing angle 98 that directs the peak of the antenna beam 100 at a selected user 84. To provide service anywhere around the base station 68, the antenna 78 preferably has the capability to point over a wide field of view (e.g. 360°). The mobile link base station 68 transmits packets of communications data or packet datum 76 over an assigned communications channel 96. The carrier frequency corresponding to that of the antenna beam 100 is used to communicate packet datum 76 to a selected user 84 preferably using any of the multiple access techniques previously described. It is important to note that the antenna 78 may also include multiple simultaneous transmitters that are utilized in the manner described and illustrated in FIG. 3.

As illustrated by the embodiments of the present invention, a "point and shoot" multiple access communication system has several advantages. The "point and shoot" system may flexibly support highly varying communications patterns such as communications density variation across a satellite footprint or changing density within the footprint over time like that which occurs in low earth orbiting (LEO) satellite systems. The flexibility results when the time of transmission and amount of data transmitted to any user or group of users are not constrained to a fixed part of a data frame. Additionally, the disclosed system requires less resource control between transmitter and receiver to support dynamic data rate variation (i.e. bandwidth demand) since the transmitter has the flexibility to unilaterally increase or decrease the number of slots used for a given user. Data transmitted to a single user or group of users may take up the entire capacity of a transmitter in one instant, and use none of the capacity in the next instance, without requiring resource control between the transmitter and receiver.

Obviously, many modifications and variations of the present invention are possible in light of the above teachings. Thus, it is to be understood that, within the scope of the appended claims, the invention may be practiced otherwise than as specifically described above.

What is claimed is:

1. A communications system comprising:
  a unit including an antenna, said unit having a field of view and means for radiating radio frequency (RF)

energy along a beam having a beam coverage area over a predetermined region of the earth, said beam having a peak wherein power of said beam is strongest;

means within said unit for receiving an RF signal containing packet datum;

a terminal station, comprising means for communicating selected station location datum to said unit and means for receiving packet datum from said unit; and means within said antenna for orienting said beam power peak to point directly at said terminal station;

wherein said means for communicating selected station locating datum comprises a receiver within said terminal station having means for receiving global positioning data, means within said terminal station for transmitting said global positioning data to said unit, and means for authenticating that a terminal station location is within a predefined area, and means for periodically transmitting terminal station location datum for terminal stations within said unit field of view to said unit.

2. A communications system as recited in claim 1, wherein said unit is a satellite located in space over the earth.

3. A communications system as recited in claim 2, wherein said satellite is located in a geostationary orbit.

4. A communications system as recited in claim 2, wherein said satellite is located in a low-earth orbit.

5. A communications system as recited in claim 2, wherein said satellite is located in a medium-earth orbit.

6. A communications system as recited in claim 1, wherein said unit is a terrestrial base station.

7. A communications system as recited in claim 1, wherein said antenna is selected from the group consisting of phased array antenna and multi-beam antenna.

8. A communications system as recited in claim 1, wherein said beam power peak is within approximately two-fifths to one-third of 1 dB less than the maximum gain of said antenna.

9. A communications system as recited in claim 1, wherein said RF signal receiving means further comprises a packet switch having a means for routing said packet datum to a unit transmitting means.

10. A communications system as recited in claim 1, wherein said RF signal receiving means comprises:

means for extracting transmission data from said packet datum, said transmission data including a station terminal destination and a transmission priority;

means for storing said packet datum in a transmitter packet buffer according to said destination and transmission priority; and means for monitoring and arbitrating packet transmissions based on said destination and transmission priority.

11. A communications system comprising:

a unit including an antenna, said unit having a field of view and means for radiating radio frequency (RF) energy along a plurality of beams each having a beam coverage area over a predetermined region of the earth, each said beam having a peak wherein power of said beam is strongest;

means within said unit for receiving an RF signal containing packet datum;

a plurality of terminal stations, each terminal station comprising means for communicating selected station location datum to said unit and means for receiving packet datum from said unit; and means within said antenna for orienting each said beam power peak to point directly at one said terminal station;

wherein said location datum communicating means comprises a receiver within each said terminal station having means for receiving global positioning data, means within each said terminal station for transmitting said global positioning data to said unit, means for authenticating that a terminal station location is within a predefined area, and means for periodically transmitting terminal station location datum for terminal stations within said unit field of view to said unit.

12. A communications system as recited in claim 11, wherein said unit is a satellite located in space over the earth.

13. A communications system as recited in claim 12, wherein said satellite is located in a geostationary orbit.

14. A communications system as recited in claim 12, wherein said satellite is located in a low-earth orbit.

15. A communications system as recited in claim 12, wherein said satellite is located in a medium-earth orbit.

16. A communications system as recited in claim 11, wherein said unit is a terrestrial base station.

17. A communications system as recited in claim 11, wherein said antenna is selected from the group consisting of phased array antenna and multi-beam antenna.

18. A communications system as recited in claim 11, wherein each said beam power peak received at a terminal station is no more than approximately 0.4 dB below the maximum gain of said antenna.

19. A communications system as recited in claim 11, wherein said RF signal receiving means further comprises a packet switch having a means for routing said packet datum to a unit transmitting means.

20. A communications system as recited in claim 11, wherein said RF signal receiving means comprises:

means for extracting transmission data from said packet datum, said transmission data including a station terminal destination and a transmission priority;

means for storing said packet datum in a transmitter packet buffer according to said destination and transmission priority; and means for monitoring and arbitrating packet transmissions based on said destination and transmission priority.

21. A communications system as recited in claim 11, wherein means for radiating radio frequency (RF) energy along said plurality of beams further comprises a plurality of simultaneous transmitters.

22. A communications system as recited in claim 21, wherein said unit further comprises means for coordinating said plurality of transmitters to eliminate co-channel interference.

23. A communications system as recited in claim 22, wherein said transmitter coordinating means comprises:

means for comparing packet terminal station destinations among said transmitters and determining an angle of separation wherein a first beam pointing angle is compared to a second beam pointing angle to produce said angle of separation;

means for comparing said angle of separation to a predetermined minimum angle of separation; and means for reordering packet datum among transmitters based on comparison of said angle of separation to said predetermined minimum angle of separation.

24. A method for reducing the latency and buffering in a multiple access communications system comprising:

locating a unit including an antenna at a predetermined location;

radiating radio frequency (RF) energy from said antenna along a beam having a beam coverage area over a predetermined region of the earth, said beam having a peak wherein power of said beam is strongest;

receiving an RF signal containing packet datum at said unit;

communicating selected location datum from a terminal station to said unit;

orienting said beam power peak to point directly at the terminal station; and transmitting said packet datum to said terminal station from said unit;

wherein communicating location datum further comprises
receiving global positioning data at said selected terminal station,
transmitting said global positioning data to said unit,
authenticating that said terminal station is within a predefined area, and
periodically transmitting to said unit, terminal station location datum for terminal stations within said unit field of view.

25. The method as recited in claim 24, wherein locating said unit at said predetermined location comprises locating a satellite in space above the earth.

26. The method as recited in claim 24, wherein locating said unit wherein locating said unit at said predetermined location comprises locating a mobile link base station at a terrestrial location.

27. The method as recited in claim 24, wherein orienting said beam power peak to point directly at said terminal station further comprises orienting said beam such that the beam power received at said terminal station is no more than approximately 0.4 dB below the maximum gain of said antenna.

28. The method as recited in claim 24, further comprises routing said packet datum to said antenna.

29. The method as recited in claim 24, wherein receiving said RF signal containing packet datum comprises:
extracting transmission data from said packet datum, said transmission data including station destination and a transmission priority;
storing said packet datum in a transmitter packet buffer according to said destination and transmission priority; and
monitoring and arbitrating packet transmissions based on said destination and transmission priority.

30. The method as recited in claim 24, wherein transmitting packet datum to said terminal station further comprises simultaneously transmitting via a plurality of transmitters.

31. The method as recited in claim 30, wherein transmitting via said simultaneous transmitters further comprises coordinating said plurality of transmitters to eliminate co-channel interference.

32. The method as recited in claim 31, wherein eliminating co-channel interference comprises:
comparing packet destinations among said transmitters and determining an angle of separation wherein a first beam pointing angle is compared to a second beam pointing angle to produce an angle of separation;
comparing said angle of separation to a predetermined minimum angle of separation; and
reordering packet datum among transmitters based on comparison of said angle of separation to said predetermined minimum angle of separation.

33. A communications system comprising:
a unit including an antenna, said unit having a field of view and means for radiating radio frequency (RF) energy along a beam having a beam coverage area over a predetermined region of the earth, said beam having a peak wherein power of said beam is strongest;
means within said unit for receiving an RF signal containing packet datum;
a terminal station, comprising means for communicating selected station location datum to said unit and means for receiving packet datum from said unit; and
means within said antenna for orienting said beam power peak to point directly at said terminal station;
wherein said location datum communicating means comprises
a receiver within said terminal station having means for receiving global positioning data,
means within said terminal station for transmitting said global positioning data to said unit,
means for authenticating that a terminal station location is within a predefined area, and
means for periodically transmitting terminal station location datum for terminal stations within said unit field of view to said unit.

34. A communications system as recited in claim 33, wherein said unit is a satellite located in space over the earth.

35. A communications system as recited in claim 34, wherein said satellite is located in a geostationary orbit.

36. A communications system as recited in claim 34, wherein said satellite is located in a low-earth orbit.

37. A communications system as recited in claim 34, wherein said satellite is located in a medium-earth orbit.

38. A communications system as recited in claim 33, wherein said unit is a terrestrial base station.

39. A communications system as recited in claim 33, wherein said antenna is selected from the group consisting of phased array antenna and multi-beam antenna.

40. A communications system as recited in claim 33, wherein said beam power peak received at the terminal station is no more than approximately 0.4 dB below the maximum gain of the antenna.

41. A communications system as recited in claim 33, wherein said RF signal receiving means further comprises a packet switch having a means for routing said packet datum to a unit transmitting means.

42. A communications system as recited in claim 33, wherein said RF signal receiving means comprises:
means for extracting transmission data from said packet datum, said transmission data including a station terminal destination and a transmission priority;
means for storing said packet datum in a transmitter packet buffer according to said destination and transmission priority; and
means for monitoring and arbitrating packet transmissions based on said destination and transmission priority.

* * * * *